Patented June 20, 1933

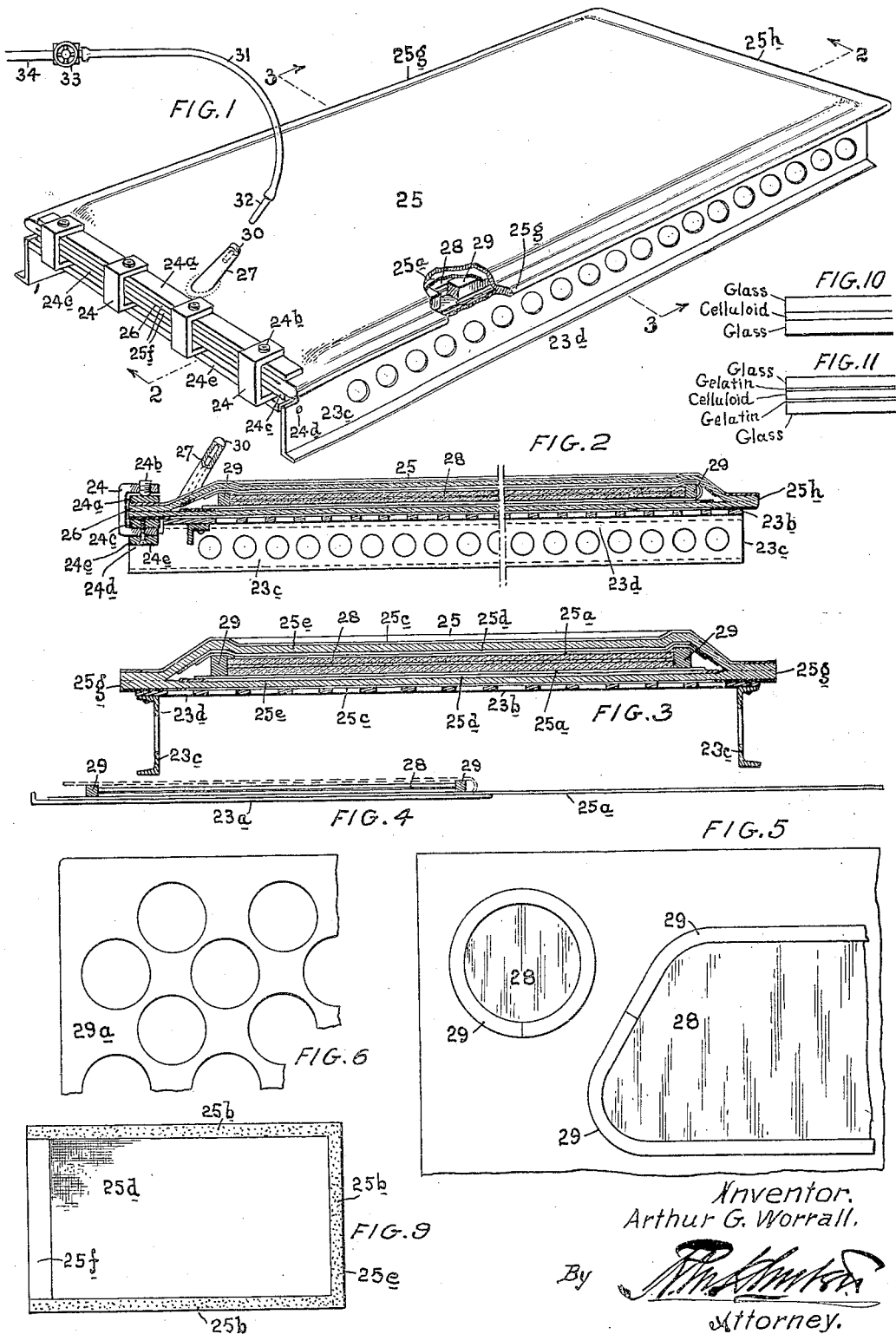

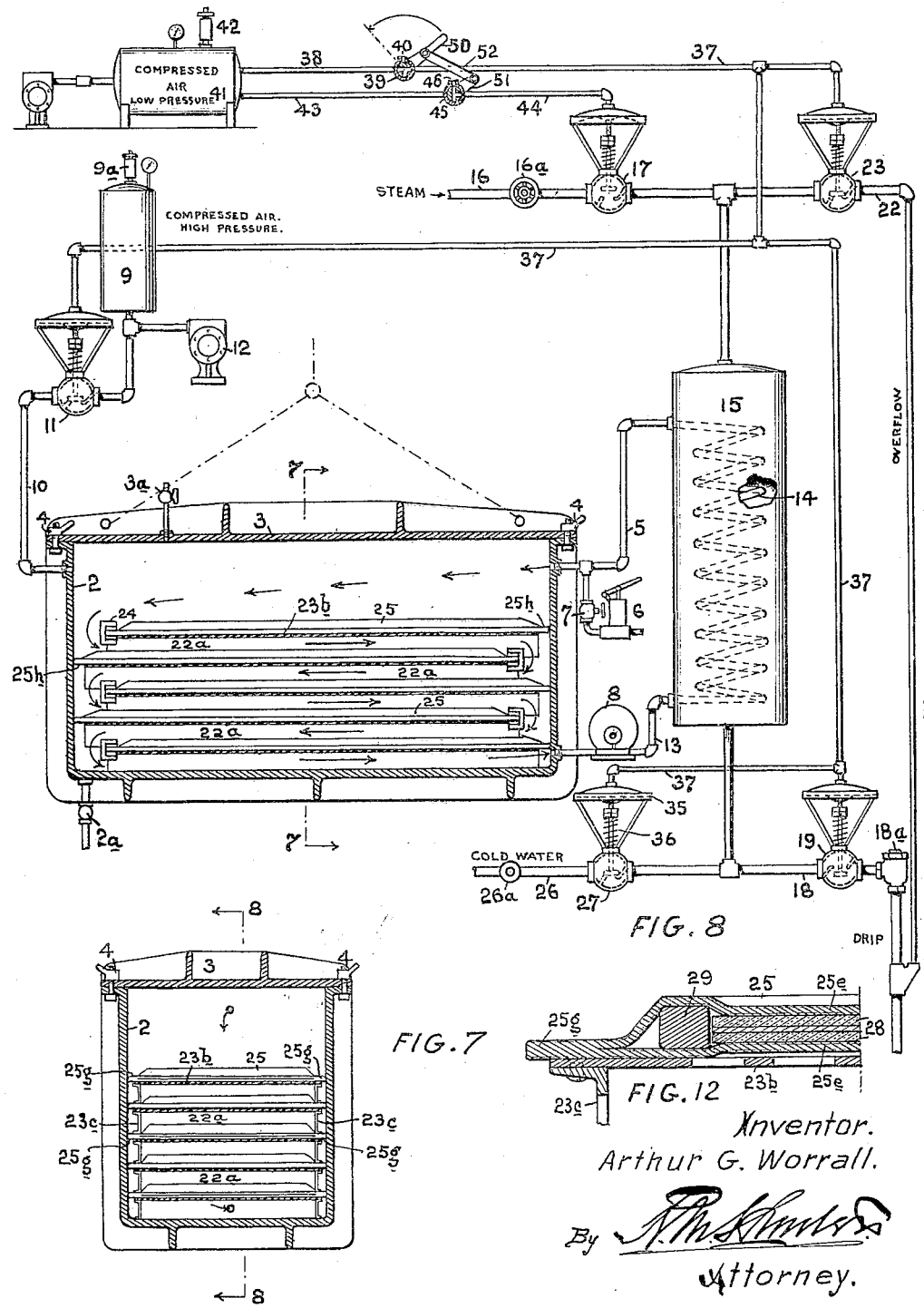

1,914,392

UNITED STATES PATENT OFFICE

ARTHUR G. WORRALL, OF PHILADELPHIA, PENNSYLVANIA, ASSIGNOR TO LOUIS J. KOLB, OF PHILADELPHIA, PENNSYLVANIA, TRADING AS SAFETEE GLASS COMPANY

MEANS FOR MAKING LAMINATED GLASS

Application filed October 30, 1928. Serial No. 315,977.

My invention has for an object, improvements in making laminated glass, more particularly directed to the method and means employed for subjecting the assembled sheets of glass and celluloid or its equivalent to heat and pressure in a manner to cause the welding and union of the sheets without danger of cracking the glass sheets thereof during their union with the celluloid or binder sheet.

My invention has a further object, in providing flexible bag enclosures for the glass and celluloid sandwiches wherein they may be subjected to vacuum action and whereby the said bags, associated with supporting tray or equivalent means, may be assembled within a pot or chamber and subjected to heat and pressure through the use of a fluid, such as water, while at the same time insuring the proper circulation thereof through the pot and between the several bags (with their contents), with the result that the contents of each of the bags will receive substantially identical treatment.

More specifically, my invention includes a flat rubber bag having an open end, combined with clamping means for hermetically sealing the same when the bag is loaded with the glass and celluloid sandwiches, said bag provided on its interior with templets in close or abutting association with the perimeters of the sandwiches and formed of a slightly greater height or thickness than the height or thickness of the assembled sheets of glass and celluloid constituting the sandwich structures, whereby, when a vacuum is provided within the bag or pressure applied from without, either or both, the rubber layer of the bag is caused to conform to the surface of the sandwich and also of the templets, and wherein further, the templets being thicker than the glass, support the inward pressure of the bag so that it cannot crush or crack the glass sheets of the sandwiches when direct outside pressure, hydraulic or otherwise, is exerted upon the bag.

As a further refinement of the templet structure, adapted for use where there is irregularity in contour of the sandwich edges, I form the templets of flexible or yielding material, such as lead, aluminum, or alloys thereof, whereby at normal temperatures the said templets may be bent or curved and shaped to fit close to the perimeter of the sandwich to be transformed into laminated glass.

My improvements further incude the flexible bags above described associated with trays or supports to sustain them one above the other within a suitable pot or tank, and so as to leave a circulating channel for the fluid with which the bags and their contents are to be treated, the said bags being extended beyond the sides of the carriage or supporting means so as to practically fit to the sides of the container or pot in which they are subjected to a moving body of fluid under heat and pressure, and furthermore, arranged above each other in staggered relation so as to provide a sinuous passage for the heating and pressure fluid, whereby all of the bags and their contents will receive efficient and equivalent treatment.

My invention further includes means for supplying a circulating fluid, under alternately heated and cooled conditions, to the pot containing the bags and their contents for subjecting them to heat and pressure, wherein the various means for providing the heat and pressure are simultaneously controlled in their proper order by a simple manual operation of a single adjustable part of said means, with the result that the application of heat and pressure automatically follows the shutting off of the cooling fluid and release of pressure, and vice versa.

My invention includes other features of construction which, together with those above enumerated, are more fully described hereinafter and pointed out in the claims.

Aside from the apparatus required and above and hereinafter referred to, my invention includes certain improvements in the method or process whereby the sandwiches are subjected to the required temperature and pressure conditions for insuring the proper union or welding of the sheet glass and binder means with complete exclusion of all air, vapor and moisture from between the several sheets or layers of materials making up the sandwiches and ultimate laminated glass, all as stated hereinafter.

My invention will be better understood by reference to the drawings, in which: Fig. 1 is a perspective view of my improved container or vacuum bag associated with its supporting means or tray; Fig. 2 is a transverse section of the same, taken on line 2—2 of Fig. 1; Fig. 3 is a longitudinal section, taken on line 3—3 of Fig. 1, with the middle portion cut away; Fig. 4 is a side view illustrating the means for inserting the sandwich and templets into the vacuum bag; Fig. 5 is a plan view illustrating the arrangement of the templets about the glass and celluloid sandwich structures; Fig. 6 is a plan view of a modified form of templet for use with articles of definite and small size; Fig. 7 is a transverse section through the pot, with a plurality of the loaded vacuum bags and trays introduced therein, taken on line 7—7 of Fig. 8; Fig. 8 is a longitudinal section through the pot, taken on line 8—8 of Fig. 7, and showing the means for supplying fluid for pressure and heat thereto; Fig. 9 is a plan view of one of the rubber and canvas sheets from which the vacuum bag is constructed; Figs. 10 and 11 are edge views of laminated glass as made in the apparatus herein described and Fig. 12 is an enlarged sectional view of a portion of Fig. 3.

2 illustrates a strong pot or chamber having a closure or lid 3 preferably arranged at the top and adapted to be secured to the pot by suitable clamping bolts 4. This cover or lid may be raised or lowered by suitable hoisting means whereby it may be removed when inserting or withdrawing the contents to and from the pot. I do not restrict myself to any particular size or construction of the pot beyond the fact that it should be of sufficient strength to resist bursting under the pressure of 160 pounds per square inch or thereabouts, which pressure is applied as hereinafter described.

The pot referred to is combined with suitable means for supplying it with cold and hot water or other fluid for providing the necessary pressure and heat control during the process of welding the glass sheets to the celluloid or binder interposed layer or sheet and comprising the sandwich when the same is suitably arranged within the pot, as hereinafter more fully described; and said water or fluid is caused to circulate back and forth in a horizontal and sinuous manner by reason of the arrangement of the plurality of vacuum bags containing the sandwiches and properly placed or stacked one above the other within the pot, as also fully described hereinafter.

Referring now to the vacuum bag construction constituting the receptacle or enclosure in which the glass and celluloid sandwich is placed during the treatment: 23d is a rectangular supporting frame or tray having a top plate or table 23b providing a supporting surface and also side channel frames 23c, and having at one end a suitable clamping means 24. 25 is a rectangular bag, preferably having a greater length than width and composed of a rubber and textile fabric for flexibility, lightness and strength, and having one end open as at 26. Extending from the bag near the open end is an exhaust tube 27 through which the air and vapor contents of the bag may be exhausted and the tube subsequently plugged, as indicated at 30 in Figs. 1 and 2.

Describing more particularly the manner of making the vacuum bag 25, the following procedure has been found to be satisfactory. The bag is formed of two rectangular sheets of rubber 25e, preferably three-sixty-fourths of an inch in thickness, each sheet having one face strengthened by a thin fabric 25c and the opposite face coated with a sheet of canvas 25d of less area than the sheet, so as to provide exposed rubber borders 25b and 25f about the canvas, the said canvas being securely cemented to the rubber. The two sheets of rubber so strengthened are placed face to face, with the canvas portions 25d between them and in direct contact. The perimeter rubber portions are then cemented and vulcanized to provide a union between the sheets along three of the edges 25b. The rubber borders 25f will face each other but will not be united, as these parts provide the opening or entrance to the bag previously indicated at 26. This reinforcing of the bag upon both the outer surface and inner surface with fabric layers protects the bag against undue wear by pressure in contact with the edges of the glass and templets contained in the bag during the treatment in making the laminated glass structures. As pointed out, the inner canvas sheets 25d do not extend to the end of the rubber where the mouth 26 of the bag is formed, and the purpose in so limiting the length of the canvas is to permit the rubber faces 25f of the top and bottom layers of the bag to come into direct contact when pressed together by clamping means hereinafter described.

28 represents the sandwich of glass and celluloid in position within the bag, and 29 are templets or noncompressible strips arranged about the perimeter of the sandwich to prevent excessive pressure coming upon the edges of the glass. For conveniently inserting the sandwich or sandwiches into the bag, I proceed as follows: Upon a thin steel plate 23a (Fig. 4), of approximately the full width of the interior of the bag, I spread a long strip of light canvas 25a and upon this and above the plate, I arrange the sandwich or sandwiches and templets and then fold the remaining portion of the canvas over the sandwich and templets above the plate, as indicated in dotted lines. The plate 23a with its load is then inserted through the mouth 26 of the bag 25 and moved backward therein until the parts are entirely within the bag and at some distance from the open end thereof. Without disturbing the sandwich or templets, I next gently withdraw the thin steel plate 23a alone, thereby leaving the sandwich structures, templets, and enclosing canvas in proper position within the bag.

While I have shown within the bag one laminated plate of relatively large size, it will be understood that the areas of these may vary according to the requirements of the article, sometimes being rectangular or circular and otherwise shaped according to its subsequent or intended use. The bag may, therefore, be practically filled with sandwich sets of glass and celluloid, according to its capacity and the relative sizes of the articles.

In Fig. 5, I have indicated different shaped sandwiches with their templets which may be arranged at one time within the vacuum bag, and in this case, the templets 29 are formed of strips rectangular in cross section which are fitted about the perimeters of the glass sandwiches. These templets may be formed of lead or other suitable flexible metals or alloys, whereby they may be bent to fit close to the perimeters of the glass sandwiches. In practice, these templets are made of somewhat greater vertical thickness than the thickness of the sandwiches, and this increase in thickness is found to be satisfactory when it is made about one-eighth of an inch. The purpose of this increased thickness of the templet is to support the upper and lower layers of the bag in such a manner that the compressive strain thereof upon the upper glass plate of the sandwich is resisted by the templet, so that excessive pressure does not come upon the extreme edge of the glass, which otherwise would have a tendency to crack or cause breaking of the glass during the application of pressure thereto at the time of the welding operation between the glass and the celluloid, (Figs. 3 and 10).

In Fig. 6, I have shown a templet 29a which consists of a plate of metal or other material with a large number of apertures bored or otherwise formed therethrough and into which apertures the sandwich forms may be inserted. This form of templet has been found useful in the making of lenses for gas masks and goggles for aviators' use. Where a large number of sandwiches are simultaneously to be treated, it is more convenient to have the templets employed in rigid form, such as here indicated, as it is not only stronger and positive in its action, but is more convenient to handle when inserting the load into the bag. The increased thickness of the templet over the thickness of the sandwiches referred to in connection with Fig. 5 is also followed in the construction shown in Fig. 6; but where the templet is in the sheet form of 29a, the increase in thickness over the thickness of the sandwich may be somewhat reduced.

After being loaded with the sandwich structures, the end layers 25f of the open end 26 of the bag are placed between clamping plate 24a and the plate 24c of the clamp 24 (hinged to the table frame by plate 24e at 24d), and said plates 24a and 24c are respectively pressed tightly upon the upper and lower layers 25f of the open end of the bag, as shown at 26, by means of clamping screws 24b, so as to hermetically seal the entrance to the bag. When this is accomplished and the plug 30 removed, the nipple 32 of vacuum tube 31 is inserted in place of the plug and thereafter the valve 33 is opened and the vacuum existing in pipe 34 acts to withdraw all of the air, vapor, moisture or other volatile substances from the bag and from between the plates of the sandwich; and aside from exhausting the air, vapor and moisture from the bag, the vacuum also causes the flexible top and bottom layers of the bag to press tightly upon the outer surfaces of the glass sheets for holding them firmly upon the intermediate celluloid or binder layer of the sandwich. When the bag has been thoroughly exhausted, the nipple 32 may be withdrawn from exhaust tube 27 of the bag, and the plug 30 quickly inserted so that the vacuum within the bag may be maintained during the remaining operations of the process.

By reference to Fig. 3, it will be seen that the lateral edges 25g of the bag project somewhat over the lateral edges of the table or tray plate 23b, and similarly, as indicated in Fig. 2, the closed end 25h of the bag may also extend slightly beyond the table or tray plate 23b, for purposes now to be described.

When the bags are fully loaded and hermetically sealed and after the desired vacuums are produced within the bags, they and their supporting frames or trays are inserted within the pot 2 and rest one upon the other from the bottom upward, in the manner indicated in Figs. 7 and 8.

Referring to Fig. 7, it will be seen that the side channel irons 23c of the supporting tray or frame for the bag, immediately above, rests upon the bag immediately below, but allowing the side edges 25g of the bags to project laterally to form a reasonably close joint with the side walls of the container, the object being to prevent undesirable upward flow of the fluids employed within the pot when circulating pressure is applied thereto. Furthermore, because of the manner of construction and assembling the bags and their supports, one above the other, the pot may be completely filled without any mechanical connection with the side walls thereof and with all of the strains transmitted to the bottom.

Referring now to Fig. 8, it will be seen that these bags and their supports are arranged in staggered relation, that is to say, the ends 25h of the bags are brought in substantial contact with the ends of the pot, whereas the opposite ends of the bags with their clamping means are positioned at some distance from the ends of the pot. This arrangement will provide a sinuous passage 22a between the successive bags and their supporting frames, by reason of which a positive circulation of the fluid is caused to take place, with the result that all of the bags are treated throughout their loaded areas and under substantially the same conditions. Furthermore, the table or tray plates 23b are preferably perforated to permit direct contact of the treating fluid with the under part of the bag, so that the contents of the bag are treated to substantially the same temperature and pressure from both the upper and lower portions thereof.

Assuming that the pot has been fully charged and its top sealed, water or fluid is delivered into the pot through a pipe 5 near its top, and is caused to circulate in a zigzag manner through the tank and between the several vacuum bags arranged therein, the water returning by a pipe 13 and recirculated through a steam heated coil 14 in a tank 15, the circulation being assured by a pump 8. The heating coil 14 is heated by steam delivered from a steam pipe 16 through a hand control valve 16a and a motor valve 17 into the top of the tank 15. The water of condensation from the tank 15 may pass off by a pipe 18 having motor control valve 19 and a thermostatic trap 18a which permits the passage of water but restricts the passage of steam.

The initial pressure of approximately 10 to 15 pounds to the circulating fluid may be provided by a pressure pump 6 of any suitable construction, the same delivering into the pipe 5 through a shut-off valve 7 which may be closed when the pot is fully charged with water, and the recirculating of the fluid between the pot and heating coil is carried on by the circulating pump 8. The water thus circulated through the pot is raised to a temperature of approximately 250° F., and it will be understood that the pressure of the steam supplied to the tank 15 shall be such as to impart that temperature to the circulating water.

After the hot water circulation has continued for a period of approximately ¼ hour, the celluloid in the sandwiches will have become softened and pliable. At this time, an additional pressure is applied to the celluloid between the glass sheets to insure positive setting of the glass and celluloid into thorough and intimate bonding contact, and this additional pressure may be provided by the pump 6 by injecting into the circulation a small additional amount of water.

On the other hand, a definite increase in the pressure may be supplied by placing the interior of the pot in communication with a compressed air receiver 9 through a pipe 10 and motor valve 11, the receiver being supplied with the requisite pressure by a pump 12 and controlled by a relief valve 9a on the receiver. The pipe 10 and receiver 9 act as a standpipe to provide a static head upon which the compressed air acts, without entering the pot.

After a reasonable length of time to insure full setting of the glass and celluloid into thorough and intimate contact, the steam is shut off by valve 16a and cold water admitted by pipe 26 and motor valve 27 to the lower part of the tank 15, and allowed to overflow by a pipe 22 under control of motor valve 23, thereby cooling the water in the coil 14 while still maintaining its pressure in the pot 2. During this operation of cooling, the circulating pump 8 continues to act and consequently the previously heated water is now gradually cooled during its circulation through the coil in the tank 15. In this manner, the circulating fluid is cooled until a temperature of about 100° F. is reached. Before opening the pot, the valves 11, 16a and 26a are closed.

The pressure within the pot may now be released by valve 3a and the pot opened for the removal of the bags therefrom. Before opening the pot, however, it is desirable to run off the water contained therein, and this may be accomplished by opening a drain pipe 2a. After the bags have been removed, the vacuum within them may be broken by removal of the plugs 30, and thereafter the clamps 24 may be opened and the bag released. The contents of the bag may now be removed through the open mouth thereof.

Referring more particularly to the motor valves 11, 17, 19, 23 and 27, the following explanations are given: These valves are of a well known type which operate the valve piece under the action of a spring 36 in one direction and a motor diaphragm (actuated by compressed air) in the other direction. In the case of motor valves 17, 23, 27, the spring acts to open the valve and the compressed air and diaphragm operates to close the valve. In the case of the motor valve 19, the reverse is provided for, that is to say, the spring operates to close the valve and the compressed air and diaphragm operate to open the valve, for reasons which will be presently explained. In the case of the motor valve 11, the same is opened by the spring and is closed by the compressed air and diaphragm, similarly to the motor valves 17, 23 and 27.

41 represents a source of compressed air which may be maintained constant at a pressure of 15 pounds by a relief valve 42, whereby that maximum pressure may be assured. Compressed air from the source 41 is supplied through a pipe 38 and branch pipes 37 to the diaphragm motors of the motor valves 11, 19, 23 and 27, whereby all of said valves may be simultaneously operated under the control of a shut-off valve 39 having a vent 40 of usual construction, so that when the pressure in pipe 38 is shut off, the branch pipes 37 are vented so as to permit the motor valves 11, 19, 23 and 27 to re-adjust themselves under the action of their springs.

Similarly, a pipe 43 leading from the source of compressed air supplies pressure through a pipe 44 to the diaphragm motor of the valve 17 which controls the steam; and the flow of the compressed air from pipe 43 to pipe 44 may be accomplished by a shut-off valve 45 having a vent 46, whereby when the compressed air supply is shut off, the air may be vented from the motor diaphragm of the motor valve 17. The valves 39 and 45 are respectively provided with arms or levers 50 and 51 which are connected by a link 52, whereby they are opened and closed inversely, that is to say, when valve 39 is opened valve 45 is closed, and vice versa.

The operation of the motor valves will now be understood to be as follows: Assuming that the hand valve 16a is closed as are also motor valves 11, 23, and 27, steam controlling motor valve 17 and drip motor valve 19 will be open. Assuming also that the pot 2 is fully charged and sealed and that the coil 14 is full of water, steam is turned on gradually by the hand valve 16a and flows into the tank 15 and displaced therefrom any water that may be contained therein, causing it, together with the water of condensation, to pass off by the drip pipe 18 through the drip valve 19 and trap 18a, which latter prevents the escape of steam. This condition continues throughout the heating operation of the circulating water which flows between the pot 2 and coil 14 until the desired heating of the celluloid has been accomplished, the temperature for which is approximately 240° to 250° F., and may be supplied by the circulating water by using steam in the tank 15 of approximately 100 pounds pressure.

The handle 51 is now operated to supply compressed air to the diaphragm motor of the valve 17 to shut off the supply of steam to the tank 15 and the compressed air is relieved from the motor valves 11, 19, 23 and 27, with the result that the first four of these valves open under the action of their springs and the motor valve 19 closes under its spring, and thereupon cold water is supplied by pipe 26 and motor valve 27 to the tank 15 to cool the circulating hot water in the coil 14, and the overflowing cooling water is allowed to escape through the motor valve 23 and pass off by overflow pipe 22. Also, simultaneously with this action, the motor valve 11 opens to permit the higher pressure of approximately 160 pounds in the reservoir 9 to be impressed upon the contents of the pot, whereby the celluloid is further compressed at about the time the circulating hot water begins to be cooled. At this time, the drip pipe for the tank 15 is closed by the motor valve 19. It will be seen that when steam valve 17 is closed, the drip valve 19 is also closed; and when the valve 17 is opened to supply steam to the tank 15, the drip valve 19 is opened to permit the water of condensation from the tank to pass off. Therefore, these two valves 17 and 19 open and close simultaneously, whereas, on the other hand, they open and close alternately with the opening and closing of the motor valves 11, 23, and 27. In this manner, all of the valves operate automatically in the proper order, and as to time, by the mere manipulation of one of the valves 39 and 45. This capacity for manipulating the valves greatly simplifies the operation and avoids all confusion.

As the motor actuated steam valve 17 opens and closes fully at each operation, and as it is preferable that the full pressure of the steam shall be delivered to the tank 15 in a more gradual manner, I prefer to employ in series with the valve 17 a manually controlled valve 16a which may be opened gradually after the rest of the valves have been set for the heating operation. The valve is also useful in case of a temporary shut down for repair of any part that might become deranged.

While I have designated certain temperatures and pressures by way of example, I do not restrict myself to the same, as any temperatures and pressures found suitable in manufacturing laminated glass may be employed, but those stated above have been found satisfactory in commercial practice with sandwiches of glass and celluloid, with or without the addition of gelatin, as indicated in Figs. 10 and 11. It will be understood, however, that where the glass sheets are thick and less flexible and also where their surfaces are not as level, a greater pressure would be employed to insure the necessary shaping of the softened celluloid to the surfaces of the glass.

It will also be understood that to insure a proper weld between the celluloid and the glass, coated or otherwise, it is essential that the celluloid shall be heated so as to be softened at the time that the pressure is being applied, but its immediate time of application may be before or at the time welding pressure is applied. In the case of thin sheets, where the glass might readily crack, it is preferable to first apply the temperature to soften the celluloid before applying the welding pressure, and that further, there shall be a preliminary low pressure applied to the glass sandwich before the celluloid is softened, and hence before the application of the full pressure, and this will be substantially provided for by the employment of the vacuum in the bags, wherein the atmospheric pressure upon the outside of the bags secures the desired result.

When I have referred to celluloid, I have used said term in the sense that it includes all equivalent substances, otherwise known as pyralin and pyroxylin, and so far as my improved apparatus is concerned, the same may be utilized in providing a union between any two sheets of material through the medium of an intermediate binder in sheet or other form. In making up the sandwiches, the handling of the same may be facilitated by employing two or more stickers placed over the perimeter of the sandwich and gummed to the opposite surfaces of the two sheets of glass, as in this manner the sheets are retained in their proper relative adjustments each to the other.

I have described my improved method and means in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having now described my invention, what I claim and desire to secure by Letters Patent is:

1. In apparatus for making laminated glass from assembled material in sandwich form, a support having on its upper part a flat sustaining surface, a rubber bag resting upon the sustaining surface of the support in a flattened condition and provided at one end with an entrance passage, clamping means for clamping the rubber layers of the entrance passage tightly together and forming an air-tight closure for the bag, and means in association with the bag whereby the same may be exhausted of gaseous and vapor contents to provide a vacuum therein and wherein further, the rubber of the bag is provided on the outside with an adhering layer of cloth and upon the inner surface with a cloth lining vulcanized to the rubber surface and terminating adjacent to the entrance passage so that at said entrance passage the upper and lower rubber layers are brought into direct contact for making a tight joint.

2. In apparatus for making laminated glass from assembled material in sandwich form, a support having on its upper part a flat sustaining surface, a rubber bag resting upon the sustaining surface of the support in a flattened condition and provided at one end with an entrance passage, clamping means for clamping the rubber layers of the entrance passage tightly together and forming an air-tight closure for the bag, templets arranged within the bag between its upper and lower layers, and means in association with the bag whereby the same may be exhausted of gaseous and vapor contents to provide a vacuum therein, and wherein further, a pot is provided for receiving a plurality of the rubber bags and their supports, and said bags having their side edges along their length projecting beyond the support therefor and forming lateral closures with the side walls of the pot when the supports are positioned and sustained therein one above the other.

3. In apparatus for making laminated glass from assembled materials in sandwich form, the combination of a rectangular pot with a plurality of flexible vacuum bags having a width substantially equal to the width of the interior of the pot and a length materially less than the interior length of the pot, and supporting means for the said bags whereby they are sustained one above the other in separated positions and arranged within the pot in staggered relation so as to provide a sinuous passage lengthwise of the pot and between the bags, and means for supplying a heating fluid to the pot and causing it to flow through the sinuous passage for heating the bags simultaneously both from above and below.

4. The invention according to claim 3, wherein further, the supporting means for the bags are each provided at one end with clamping means for sealing the entrance to the bags.

5. In apparatus for making laminated glass from assembled materials in sandwich form, the combination of a rectangular pot with a plurality of flexible vacuum bags having a width substantially equal to the width of the interior of the pot and a length materially less than the interior length of the pot, and supporting means for the said bags whereby they are sustained one above the other in separated positions and arranged within the pot in staggered relation so as to provide a sinuous passage lengthwise of the pot and between the bags, and means for supplying a heating fluid to the pot and causing it to flow through the sinuous passage for heating the bags simultaneously both from above and below, and wherein further, the supporting means for each of the bags constitutes a sustaining frame of less width than the width of the bags, whereby the edges of the bags project beyond the said frame and in close relation with the side walls of the pot.

6. In apparatus for making laminated glass from assembled materials in sandwich form, the combination of a rectangular pot with a plurality of flexible vacuum bags having a width substantially equal to the width of the interior of the pot and a length materially less than the interior length of the pot, and supporting means for the said bags whereby they are sustained one above the other in separated positions and arranged within the pot in staggered relation so as to provide a sinuous passage lengthwise of the pot and between the bags, and means for supplying a heating fluid to the pot and causing it to flow through the sinuous passage for heating the bags simultaneously both from above and below, and wherein further, the supporting means for the bags each have downwardly projecting side bars separated a width less than the width of the bag and each adapted to rest upon the bag immediately below when said bags and supports are positioned one above the other in the pot.

7. In apparatus of the character stated, the combination of a sealed pot with a flexible container arranged within the pot and removable therefrom for holding articles to be subjected to heat and pressure, means for circulating a fluid through the pot, means for carrying the pressure of the fluid, and means for alternately heating and cooling the circulating fluid, including a steam pipe for supplying the heating medium, a cold water pipe for supplying the cooling medium, an overflow pipe to permit the cooling medium to escape after performing its cooling function, a drip pipe for permitting discharge of the condensation from the steam after performing its function, motor valves for respectively controlling the supply of steam and cooling medium and controlling the overflow pipe and drip pipe respectively, and means for supplying motive power to the motor valves and causing the steam valve and drip valve to open simultaneously with the closing of the cold water valve and overflow valve, and vice versa, and wherein means are provided for imparting a predetermined pressure to the circulating fluid, and additional means are also provided for increasing the pressure within the pot at a time when the heating of the fluid has been completed, said additional means comprising a compressed air receiver, an air pump for producing a pressure in the receiver greater than the normal pressure of the circulating fluid in the pot, a pipe connection between the reservoir and the pot, and a control valve therein.

8. In apparatus for making laminated glass from assembled materials in sandwich form, the combination of an air-tight pot provided with means for positively circulating the heating and cooling fluids through the same and a plurality of rubber bags and supports therefor arranged one above the other within the pot in staggered relation and forming a sinuous fluid passage between them lengthwise of the bags, the said bags being so positioned within the pot that the heating and cooling fluids are caused to flow through the sinuous passage so as to cause the said circulating fluid to positively flow in contact with all of the bags in succession.

In testimony of which invention, I hereunto set my hand.

ARTHUR G. WORRALL.